US008126471B2

(12) United States Patent
Ahn et al.

(10) Patent No.: US 8,126,471 B2
(45) Date of Patent: Feb. 28, 2012

(54) COGNITIVE RADIO COMMUNICATION METHOD FOR CONTROLLING SENSING OPERATION AND COGNITIVE RADIO COMMUNICATION APPARATUS ENABLING THE METHOD

(75) Inventors: Hyun Gi Ahn, Incheon (KR); Tae In Hyon, Hwasung-si (KR); Kyung Hun Jang, Suwon-si (KR); In Sun Lee, Seongnam-si (KR); Youngsoo Kim, Seoul (KR); Hyo Sun Hwang, Seoul (KR); Hyun Ho Choi, Yongin-si (KR); Seungmo Kim, Daejeon (KR); Youngnam Han, Daejeon (KR); Wan Choi, Daejeon (KR)

(73) Assignees: Samsung Electronics Co., Ltd., Suwon-si (KR); Korea Advanced Institute of Science and Technology (KAIST), Daejeon (KR)

( * ) Notice: Subject to any disclaimer, the term of this patent is extended or adjusted under 35 U.S.C. 154(b) by 938 days.

(21) Appl. No.: 12/128,742

(22) Filed: May 29, 2008

(65) Prior Publication Data

US 2009/0186646 A1 Jul. 23, 2009

(30) Foreign Application Priority Data

Jan. 21, 2008 (KR) ........................ 10-2008-0006296

(51) Int. Cl.
*H04Q 7/20* (2006.01)
(52) U.S. Cl. ......... 455/450; 455/509; 370/342; 370/259
(58) Field of Classification Search .................. 455/450, 455/509; 370/342, 259, 252
See application file for complete search history.

(56) References Cited

U.S. PATENT DOCUMENTS
2004/0185861 A1* 9/2004 Domon et al. ................ 455/450

FOREIGN PATENT DOCUMENTS
JP 2007-88940 4/2007
JP 2007-300419 11/2007

* cited by examiner

*Primary Examiner* — Phuoc Doan
(74) *Attorney, Agent, or Firm* — NSIP Law (57) ABSTRACT

A cognitive radio communication apparatus and method to control a sensing operation. The cognitive radio communication apparatus includes an information receiver to receive channel state information associated with a channel occupancy state of a primary system from at least one sensing node of a secondary system; a sensing control unit to control a sensing period of the at least one sensing node according to a change pattern of the channel occupancy state, based on the channel state information; and a control information transmitter to transmit control information associated with the controlled sensing period to at least one member node of the secondary system.

25 Claims, 8 Drawing Sheets

| SENSING TIME INDEX | CHANNEL OCCUPANCY STATE | PRIMARY TERMINAL 1 | PRIMARY TERMINAL 2 | PRIMARY TERMINAL 3 |
|---|---|---|---|---|
| $S_1$ | Ch1 Ch2 Ch3 Ch4 | Ch1 Ch2 Ch3 Ch4 | Ch1 Ch2 Ch3 Ch4 | Ch1 Ch2 Ch3 Ch4 |
| $S_2$ | Ch1 Ch2 Ch3 Ch4 | Ch1 Ch2 Ch3 Ch4 | Ch1 Ch2 Ch3 Ch4 | Ch1 Ch2 Ch3 Ch4 |
| $S_3$ | Ch1 Ch2 Ch3 Ch4 | Ch1 Ch2 Ch3 Ch4 | Ch1 Ch2 Ch3 Ch4 | Ch1 Ch2 Ch3 Ch4 |
| $S_4$ | Ch1 Ch2 Ch3 Ch4 | Ch1 Ch2 Ch3 Ch4 | Ch1 Ch2 Ch3 Ch4 | Ch1 Ch2 Ch3 Ch4 |
| $S_5$ | Ch1 Ch2 Ch3 Ch4 | Ch1 Ch2 Ch3 Ch4 | Ch1 Ch2 Ch3 Ch4 | Ch1 Ch2 Ch3 Ch4 |

COGNITIVE RADIO COMMUNICATION METHOD FOR CONTROLLING SENSING OPERATION AND COGNITIVE RADIO COMMUNICATION APPARATUS ENABLING THE METHOD

CROSS-REFERENCE TO RELATED APPLICATION

This application claims the benefit of Korean Patent Application No. 2008-6296, filed in the Korean Intellectual Property Office on Jan. 21, 2008 the disclosure of which is incorporated herein by reference.

BACKGROUND OF THE INVENTION

1. Field of the Invention

Aspects of the invention relate to technology that can control a sensing operation of a communication apparatus in a communication system using cognitive radio technology.

2. Description of the Related Art

According to cognitive radio technology, a communication apparatus belonging to a secondary system periodically or non-periodically senses frequency resources that are not used by a primary system, identifies an available frequency resource, and transmits and receives data using the available frequency resource. With respect to the available frequency resource, the primary system has priority over the secondary system. When there is a likelihood that a signal of the secondary system may conflict with a signal of the primary system, the communication apparatus of the secondary system must suspend a communication operation or change a frequency band in use.

Currently, research is being conducted regarding determining whether the secondary system is performing the communication operation. One scheme in particular that sequentially performs a fast sensing operation and a fine sensing operation is receiving much attention. According to the above scheme, the secondary system can quickly determine whether a signal received during a fast sensing section exists. The fast sensing section can be a relatively short time slot. The secondary system can compare power of the received signal with a predetermined sensing level to thereby quickly determine whether the received signal exists. If the signal received during the fast sensing section exists, the secondary system can specifically determine whether a signal received during a fine sensing section is transmitted from the primary system. The fine sensing section can be a relatively long time slot. The secondary system can specifically determine whether the received signal is transmitted from the primary system using a matched filter and the like.

There is a need to control a sensing operation of the secondary system. For example, when a channel being used by the primary system rarely changes, the secondary system should not frequently perform the sensing operation. Conversely, when the channel being used by the primary system changes frequently, the secondary system should perform the sensing operation frequently. Accordingly, there is a need for technology that can control a sensing operation of a secondary system according to a channel occupancy state of a primary system.

SUMMARY OF THE INVENTION

According to an aspect of the invention, a cognitive radio communication apparatus for sensing control is provided. The apparatus includes an information receiver to receive channel state information associated with a channel occupancy state of a primary system from at least one sensing node of a secondary system; a sensing control unit to control a sensing period of the at least one sensing node according to a change pattern of the channel occupancy state, based on the channel state information; and a control information transmitter to transmit control information associated with the controlled sensing period to at least one member node of the secondary system.

According to another aspect of the invention, a cognitive radio terminal device is provided. The terminal device includes an information transmitter to recognize a channel occupancy state of a primary system and to transmit channel state information to a cognitive radio base station; a control information receiver to receive control information associated with a sensing period from the cognitive radio base station; and a sensing unit to sense the channel occupancy state of the primary system according to the sensing period, based on the control information.

According to still another aspect of the invention, a communication apparatus to transmit/receive a signal generated according to a data frame is provided. The communication apparatus includes a sensing subframe that is a time slot where at least one sensing node of a secondary system senses a channel occupancy state of a primary system; a notification subframe that is a time slot where the at least one sensing node transmits channel state information associated with the channel occupancy state to a cognitive radio base station; a control information subframe that is a time slot where the cognitive radio base station transmits control information to at least one member node of the secondary system, wherein the cognitive radio base station controls a sensing period of the at least one sensing node according to a change pattern of the channel occupancy state, based on the channel state information, and the control information is associated with the controlled sensing period; and a data subframe that is a time slot where the cognitive radio base station and the at least one member node perform data communication.

According to yet another aspect of the invention, a method of operating a cognitive radio base station is provided. The method includes receiving channel state information associated with a channel occupancy state of a primary system from at least one sensing node of a secondary system; controlling a sensing period of the at least one sensing node according to a change pattern of the channel occupancy state, based on the channel state information; and transmitting control information associated with the controlled sensing period to at least one member node of the secondary system.

According to still another aspect of the invention, a method of operating a cognitive radio terminal device is provided. The method includes recognizing a channel occupancy state of a primary system to transmit channel state information to a cognitive radio base station; receiving control information associated with a sensing period from the cognitive radio base station; and sensing the channel occupancy state of the primary system according to the sensing period, based on the control information.

Aspects of the invention provide a cognitive radio communication apparatus and method that can adaptively control a sensing period of a sensing node or a number of sensing nodes according to a change pattern of a channel occupancy state to thereby enable a cognitive radio terminal to more effectively perform a sensing operation.

Other aspects of the invention also provide a cognitive radio communication apparatus and method that can provide a data frame appropriate for a communication system disclosed by the invention to thereby more effectively perform communication.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to present embodiments of the present invention, examples of which are illustrated in the accompanying drawings, wherein like reference numerals refer to the like elements throughout. The embodiments are described below in order to explain the present invention by referring to the figures.

Figure 1:
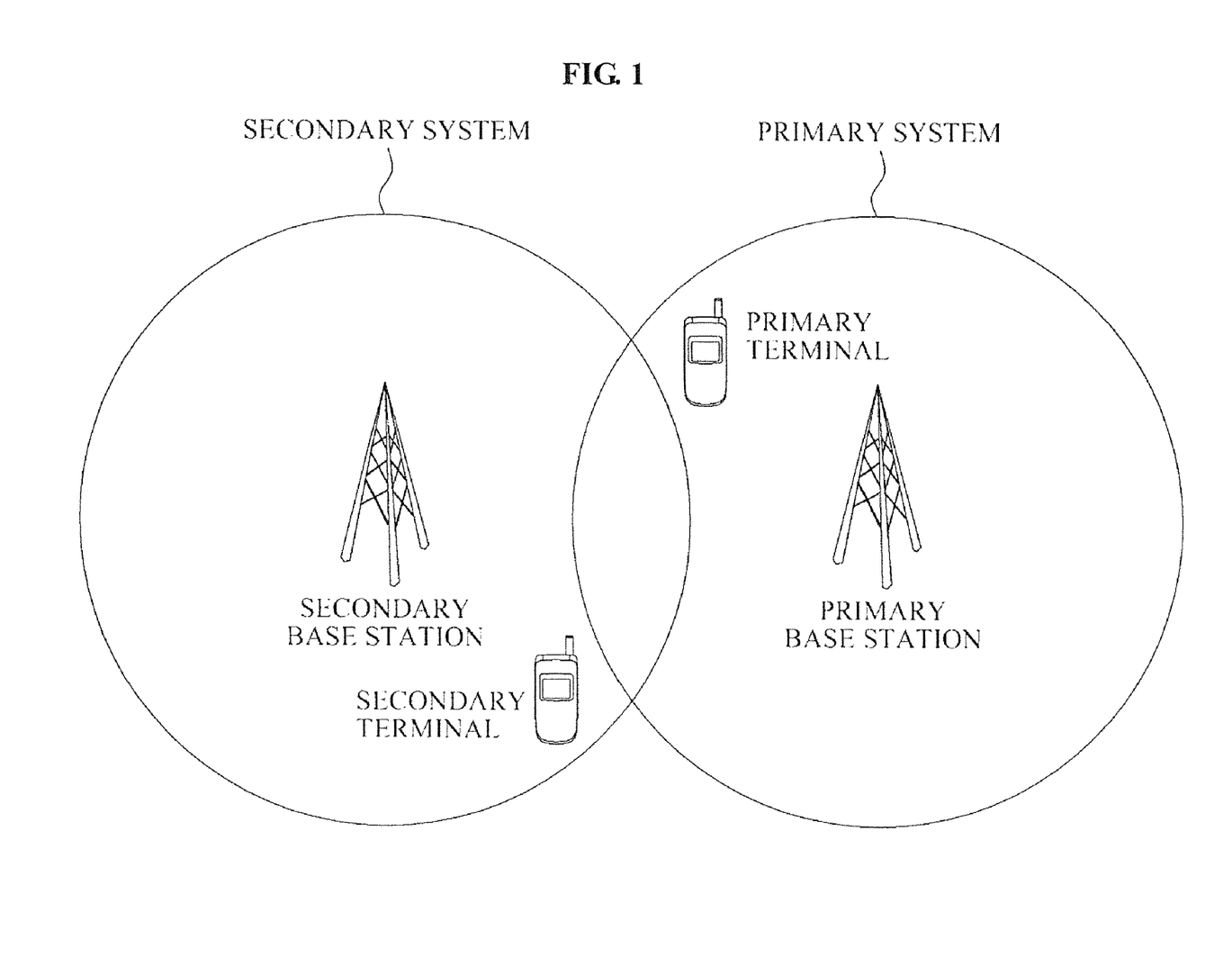
FIG. 1 illustrates an example of a primary system and a secondary system according to an embodiment of the invention.

FIG. 1 shows an example of a primary system and a secondary system according to an embodiment of the invention. The primary system includes a primary base station and a primary terminal. The secondary system includes a secondary base station and a secondary terminal.

The secondary terminal and the secondary base station may recognize, as an available frequency resource, a portion of frequency resources or complete frequency resources that are allocated to the primary system, using cognitive radio technology. The secondary terminal and the secondary base station may communicate with each other using the recognized available frequency resource.

The secondary terminal may transmit a signal to the secondary base station in an uplink time using the available frequency resource. The secondary base station may transmit the signal to the secondary terminal in a downlink time using the available frequency resource. The primary terminal and the primary base station may independently use a pre-allocated frequency resource without considering whether the secondary terminal or the secondary base station transmits and receives the signal using the same frequency resource.

The signal transmitted from the secondary base station and the secondary terminal may be received by the primary terminal or the primary base station. When interference occurs in the primary terminal or the primary base station due to the signal transmitted from the secondary base station and the secondary terminal, or when an interference level is greater than a predetermined threshold, the primary terminal or the primary base station may not perform a normal communication operation.

Even though the secondary terminal and the secondary base station are using the available frequency resource, the primary base station or the primary terminal may have priority over the secondary terminal or the secondary base station regarding use of the available frequency resource. Accordingly, the secondary base station and the secondary terminal should change the available frequency resource in use or suspend a communication operation.

Figure 2:
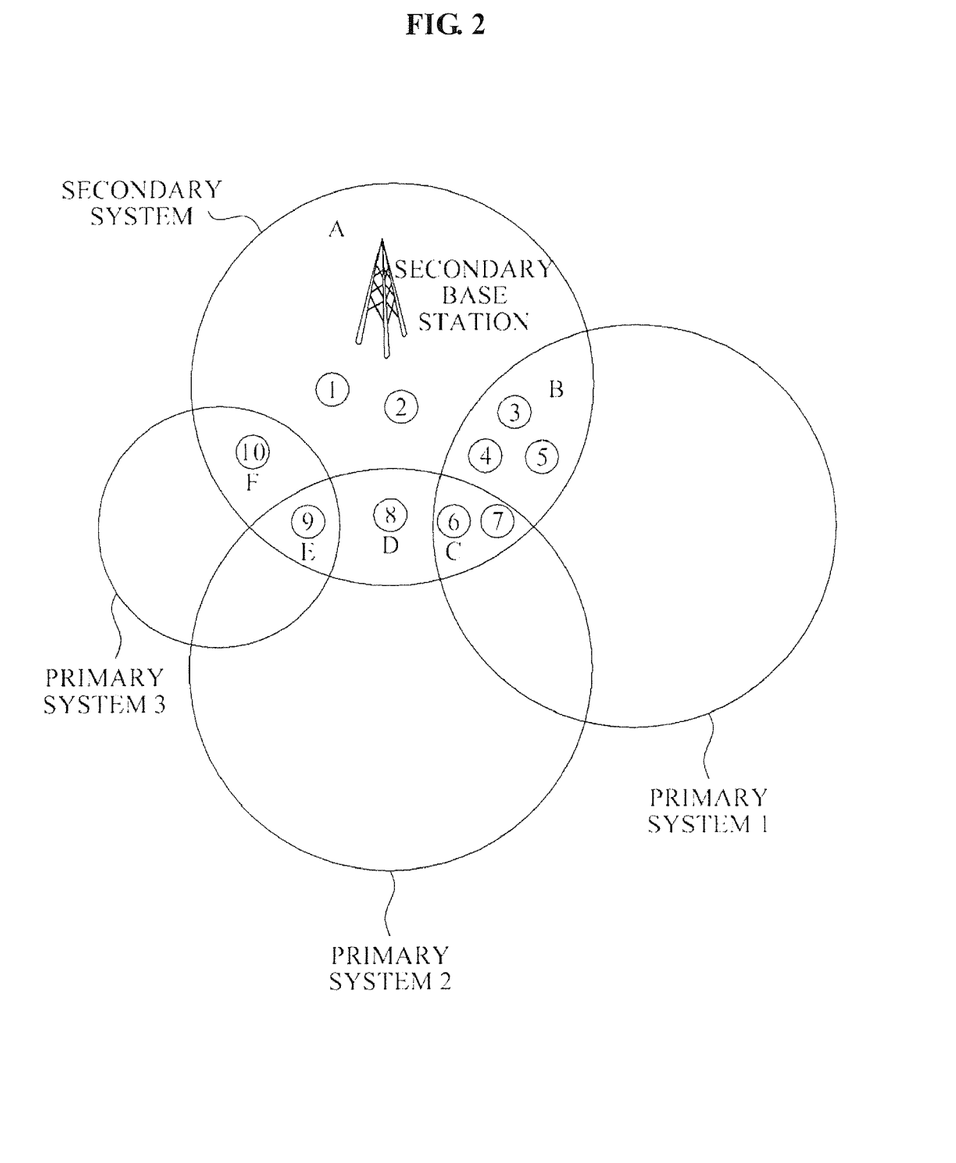
FIG. 2 illustrates a plurality of primary systems and a secondary system that includes a plurality of clusters according to an embodiment of the invention.

FIG. 2 shows a plurality of primary systems and a secondary system that includes a plurality of clusters according to an embodiment of the invention. The secondary system includes a secondary base station and secondary terminals ①, ②, ③, ④, ⑤, ⑥, ⑦, ⑧, ⑨, and ⑩. In order not to conflict with primary system 1, primary system 2, and primary system 3, the secondary system must appropriately sense the primary system 1, the primary system 2, and the primary system 3, which are adjacent primary systems.

The secondary terminals ①, ②, ③, ④, ⑤, ⑥, ⑦, ⑧, ⑨, and ⑩ may be grouped into six clusters based on their locations. For example, as shown in FIG. 2, the secondary terminals ① and ② are grouped into cluster A. The secondary terminals ③, ④, and ⑤ are grouped into cluster B. The secondary terminals ⑥ and ⑦ are grouped into cluster C. The secondary terminal ⑧ is grouped into cluster D. The secondary terminal ⑨ is grouped into cluster E, and the secondary terminal ⑩ is grouped into cluster F.

Since secondary terminals belonging to the same cluster affect the same primary system, all the secondary terminals belonging to the same cluster do not need to perform the sensing operation. For example, the secondary terminals ③, ④, and ⑤ of the cluster B affect the primary system 1, but affect the primary system 2 and the primary system 3 negligibly. Accordingly, the secondary terminals ③, ④, and ⑤ should commonly determine whether a signal of the primary system 1 exists. A portion of the secondary terminals ③, ④, and ⑤ may determine whether the signal of the primary system 1 exists and transmit information associated with the determination result to the secondary base station. Based on the information, the base station may determine whether to change the radio resource or the channel in use, or whether to suspend the communication operation.

The secondary terminals belonging to the same cluster are referred to as member nodes, and a node selected from the member nodes is a sensing node to perform the sensing operation. At least one sensing node may be selected. For example, all, some, or only one of the member nodes may be selected as the sensing nodes. Accordingly, it is possible to prevent an unnecessary sensing operation by clustering secondary terminals and selecting in advance a sensing node with respect to each cluster.

Although not shown, primary terminals belonging to primary systems may be mobile. The primary terminals may repeatedly use or may not use channels depending on a time or a location. In this case, a channel occupancy state of a corresponding primary system may change in real time.

It may be ineffective or inefficient for the sensing node to perform the sensing operation per a certain period. For example, when the channel occupancy state of the primary system rarely changes, the primary system and the secondary system may coexist even when the sensing node performs the sensing operation with a relatively longer sensing period. When the channel occupancy state of the primary system greatly or frequently changes, it may be necessary to decrease the sensing period. Increasing the number of sensing nodes may also be effective.

Figure 3:
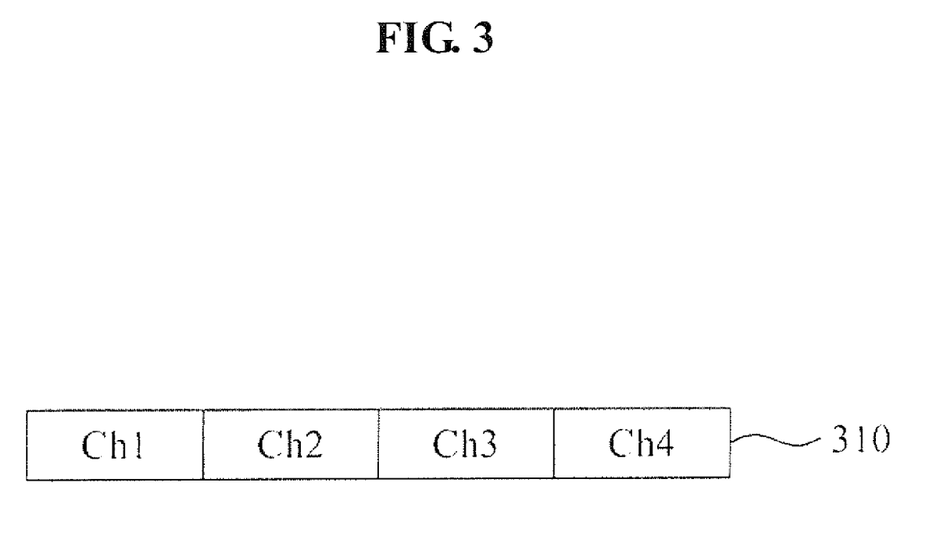
FIG. 3 illustrates an example of channels according to an embodiment of the invention.
Figure 4:
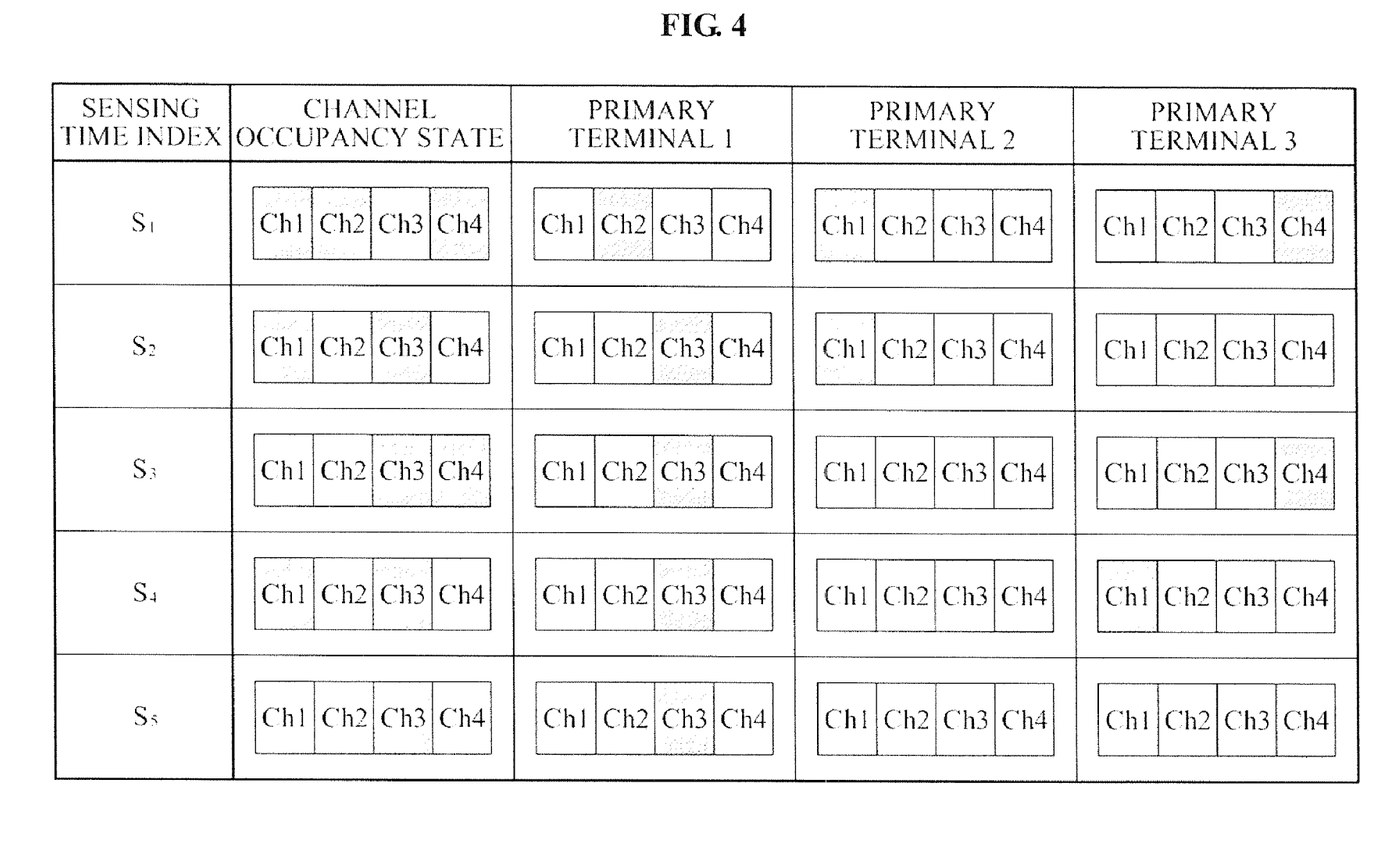
FIG. 4 illustrates an example of a channel occupancy state based on a sensing index according to an embodiment of the invention.

FIG. 3 shows an example of channels 310 according to an embodiment of the invention. FIG. 4 shows an example of a channel occupancy state based on a sensing index according to an embodiment of the invention. Referring to FIG. 3, channel 1 (Ch1), channel 2 (Ch2), channel 3 (Ch3), and channel 4 (Ch4) may be used by a primary system and a secondary system.

Referring to FIG. 4, $S_1$, $S_2$, $S_3$, $S_4$, and $S_5$ are sensing time indexes. A sensing node of a secondary system may perform sensing in the sensing time indexes $S_1$, $S_2$, $S_3$, $S_4$, and $S_5$ sequentially with respect to primary terminal 1, primary terminal 2, and primary terminal 3.

In the sensing time index $S_1$, the primary terminal 1 uses the channel 2, the primary terminal 2 uses the channel 1, and the primary terminal 3 uses the channel 4. The channel 3 is an empty channel that is not used by any primary terminal. If a weight of a channel in use is '−1' and a weight of the empty channel is '+1', the whole channel occupancy state in the sensing time index $S_1$ may be '−1−1+1−1=−2'. In the sensing time index $S_2$, since the primary terminal 1 uses the channel 3, the primary terminal 2 uses the channel 1, and the primary terminal 3 does not use any channel, the sensing node may identify the whole channel occupancy state as '−1+1−1+1=0'.

In the sensing time index $S_3$, since the primary terminal 1 uses the channel 3, the primary terminal 3 uses the channel 4, and the primary terminal 2 does not use any channel, the whole channel occupancy state is '+1+1−1−1=0'. In the sensing time index $S_4$, since the primary terminal 1 uses the channel 3, the primary terminal 3 uses the channel 1, and the primary terminal 2 does not use any channel, the whole channel occupancy is '−1+1−1+1=0'. In the sensing time index $S_5$, since only the primary terminal 1 uses the channel 3, and the primary terminal 2 and the primary terminal 3 do not use any channel, the whole channel occupancy state is '+1+1−1+1=2'.

While sequentially performing the sensing operation, the sensing node may transmit the sensing results of the primary terminals to an access point or a base station of the secondary system. Accordingly, the base station or the access point may recognize a change pattern of the whole channel occupancy state. As described above, the base station or the access point may recognize the change pattern of the whole channel occupancy to thereby determine the mobility of the primary terminals, the degree of the mobility, a change amount of radio resources used by the primary terminals, and the like.

When the change of the whole channel occupancy over time is small, the primary system and the secondary system may coexist without the sensing node performing more than a minimum number of sensing operations. In this case, the base station or the access point may increase a sensing period, which is a temporal period where the sensing node performs the sensing operation. It is thus possible to prevent the sensing node from frequently performing the sensing operation unnecessarily. Also, since the change of the whole channel occupancy is small, the base station or the access point may decrease a number of sensing nodes to thereby optimize the number of sensing nodes.

Conversely, when the change of the channel occupancy state over time is large, that the sensing node performs the sensing operation a relatively greater number of times during a given time may help the primary system and the secondary system coexist. Accordingly, the base station or the access point may decrease the sensing period. The base station or the access point may also increase the number of sensing nodes in this situation.

The base station or the access point may recognize an available channel based on information associated with the channel occupancy state transmitted from the sensing node. When a conflict occurs between the primary system and the secondary system, the base station or the access point may transmit information associated with an available channel to member nodes. The member nodes may change a channel in use based on the available channel information and thus may avoid conflicting with the primary system.

Figure 5:
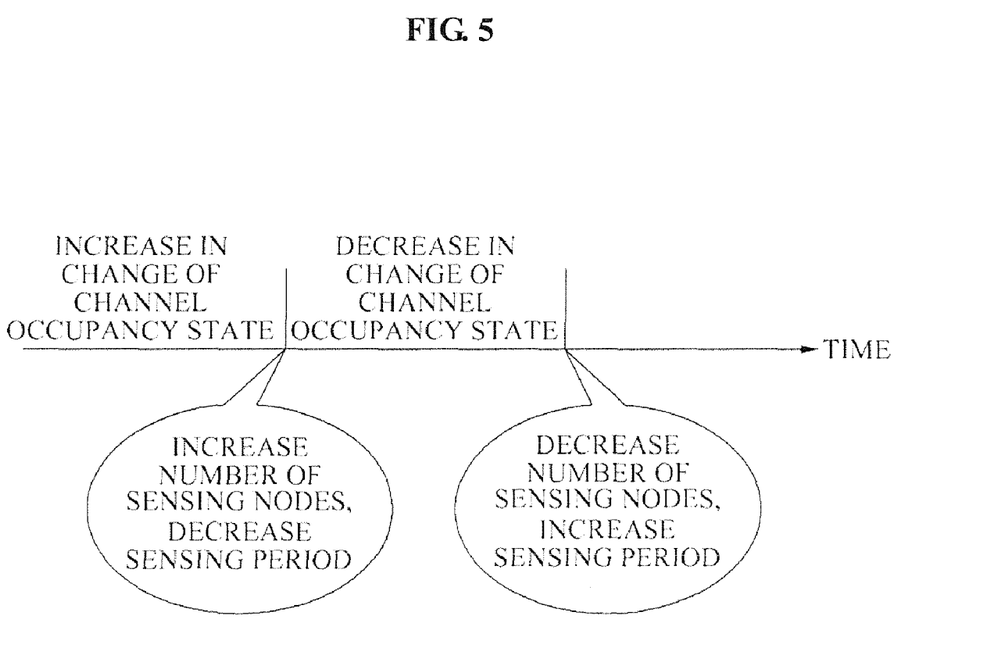
FIG. 5 illustrates a change of a sensing period and a number of sensing nodes according to a change of a channel occupancy state according to an embodiment of the invention.

FIG. 5 shows a change of a sensing period and a number of sensing nodes based on a change of a channel occupancy state according to an embodiment of the invention. An access point or a base station belonging to a secondary system may control a number of sensing nodes or a sensing period according to a change pattern of a channel occupancy state.

When a change of the channel occupancy state increases, the base station or the access point may increase the number of sensing nodes and decrease the sensing period. Conversely, when the change of the channel occupancy state decreases, the base station or the access point may decrease the number of sensing nodes and increase the sensing period. Although not shown in FIG. 5, the base station or the access point may recognize the channel occupancy state in real time and transmit information associated with an available channel to the member nodes, so that the member nodes may use the available channel.

Figure 6:
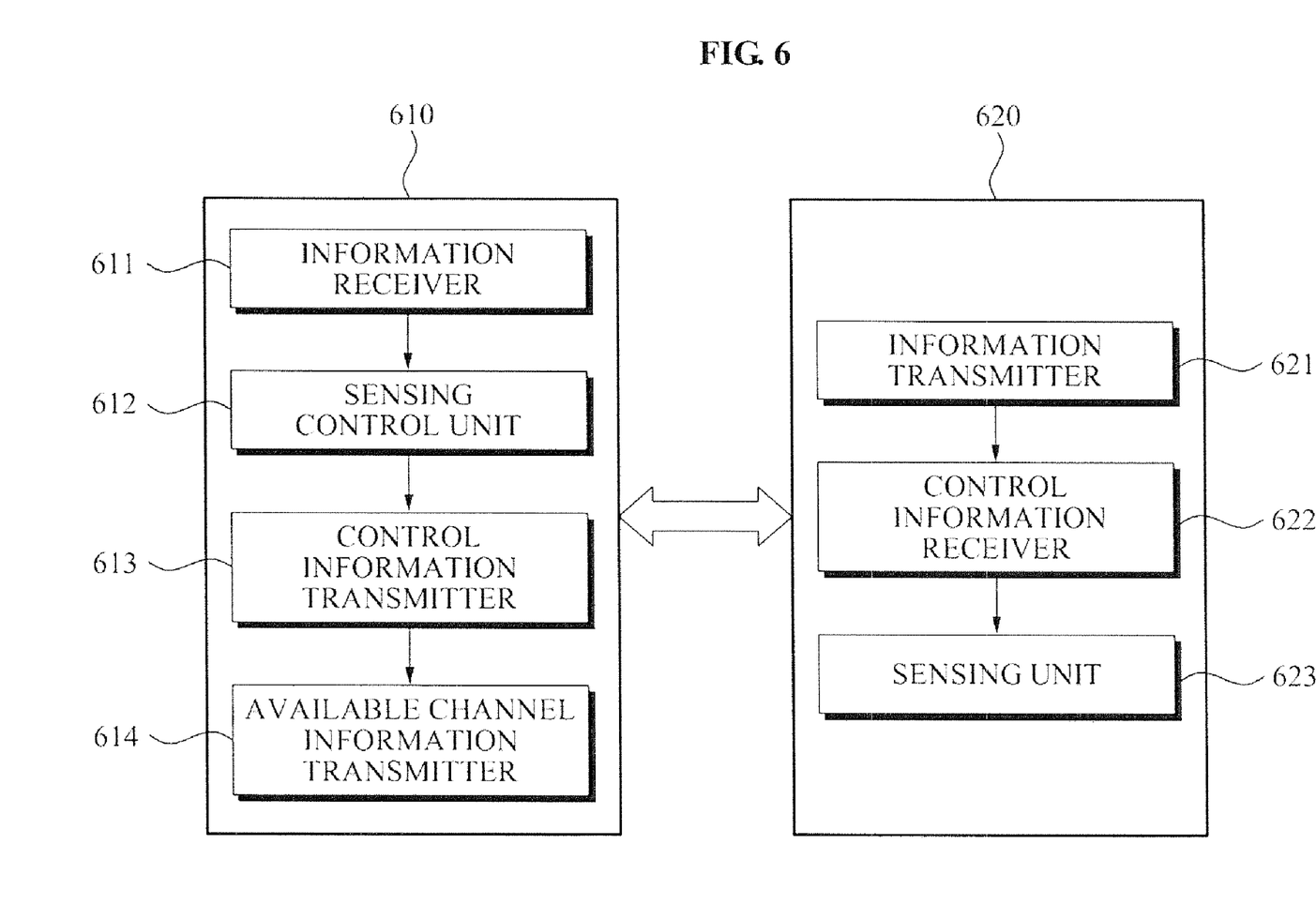
FIG. 6 is a block diagram of a cognitive radio base station and a cognitive radio terminal device according to an embodiment of the invention.

FIG. 6 shows a cognitive radio base station 610 and a cognitive radio terminal device 620 according to an embodiment of the invention. The cognitive radio base station 610 may include an information receiver 611, a sensing control unit 612, a control information transmitter 613, and an available channel information transmitter 614. The cognitive radio terminal device 620 may transmit an information transmitter 621, a control information receiver 622, and a sensing unit 623. According to other aspects of the invention, the cognitive radio base station 610 and the cognitive radio terminal device 620 may each include additional and/or different components. Similarly, two or more of the above units may be integrated into a single device. The cognitive radio terminal device 620 may be any device capable of operating in a cognitive radio environment, such as a computer, a laptop, a mobile phone, a personal digital assistant, or a personal entertainment device.

The cognitive radio terminal device 620 may recognize a channel occupancy state of a primary system to generate channel state information. The information transmitter 621 may transmit the channel state information to the cognitive radio base station 610. The information receiver 611 of the cognitive radio base station 610 may receive the channel state information associated with the channel occupancy state of the primary system.

The sensing control unit 612 may control a sensing period of the cognitive radio terminal device 620 according to a change pattern of the channel occupancy state, based on the channel state information. The sensing control unit 612 may control a number of sensing nodes according to the change pattern of the channel occupancy state.

The control information transmitter 613 may transmit control information associated with the controlled sensing period and the number of sensing nodes to member nodes that are included in the cognitive radio terminal device 620. The control information receiver 622 of the cognitive radio terminal device 620 may receive the control information. The sensing unit 623 may sense the channel occupancy state of the primary system according to the controlled sensing period, based on the control information.

The available channel information transmitter 614 of the cognitive radio base station 610 may recognize an available channel based on the channel state information and transmit information associated with the available channel to the member nodes of the cognitive radio terminal device 620. The member nodes may change a channel in use to the available channel.

Figure 7:
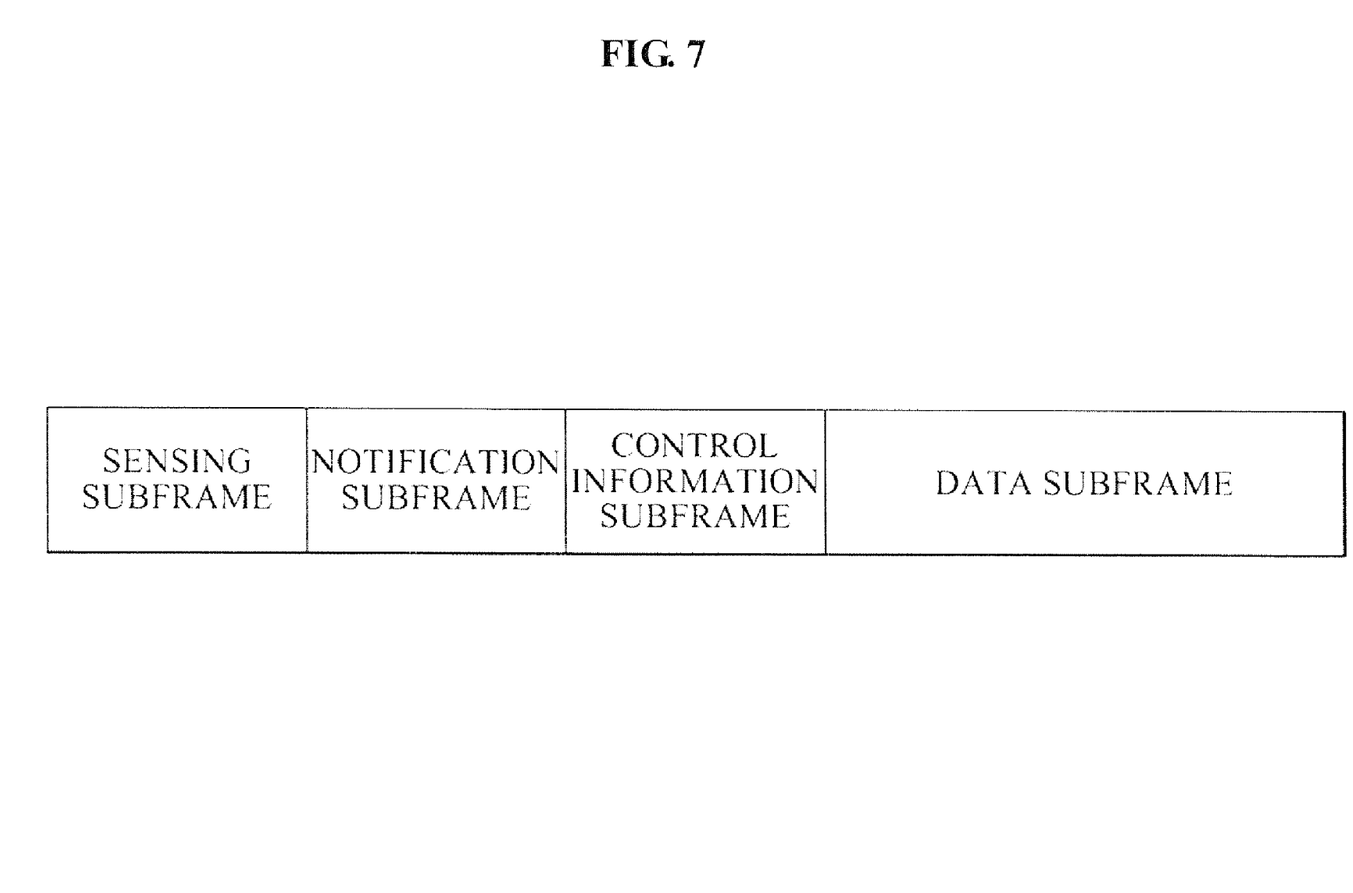
FIG. 7 illustrates an example of a data frame according to an embodiment of the invention.

FIG. 7 shows a data frame according to an embodiment of the invention. The data frame may include a sensing subframe, a notification subframe, a control information subframe, and a data subframe. The data frame may also include additional subframes not shown.

In the sensing subframe, at least one sensing node belonging to a secondary system may sense a channel occupancy state of a primary system. In the notification subframe, the at least one sensing node may transmit channel state information associated with the channel occupancy state to a cognitive radio base station.

In the control information subframe, the cognitive radio base station may transmit control information to at least one member node of the secondary system. The cognitive radio base station may also recognize an available channel based on the channel state information and transmit information associated with the available channel to at least one member node.

In the data subframe, the cognitive radio base station and the at least one member node may perform data communication. Description made with reference to FIGS. 1 through 6 may also be applicable to the data frame of FIG. 7 and thus further detailed description will be omitted here.

Figure 8:
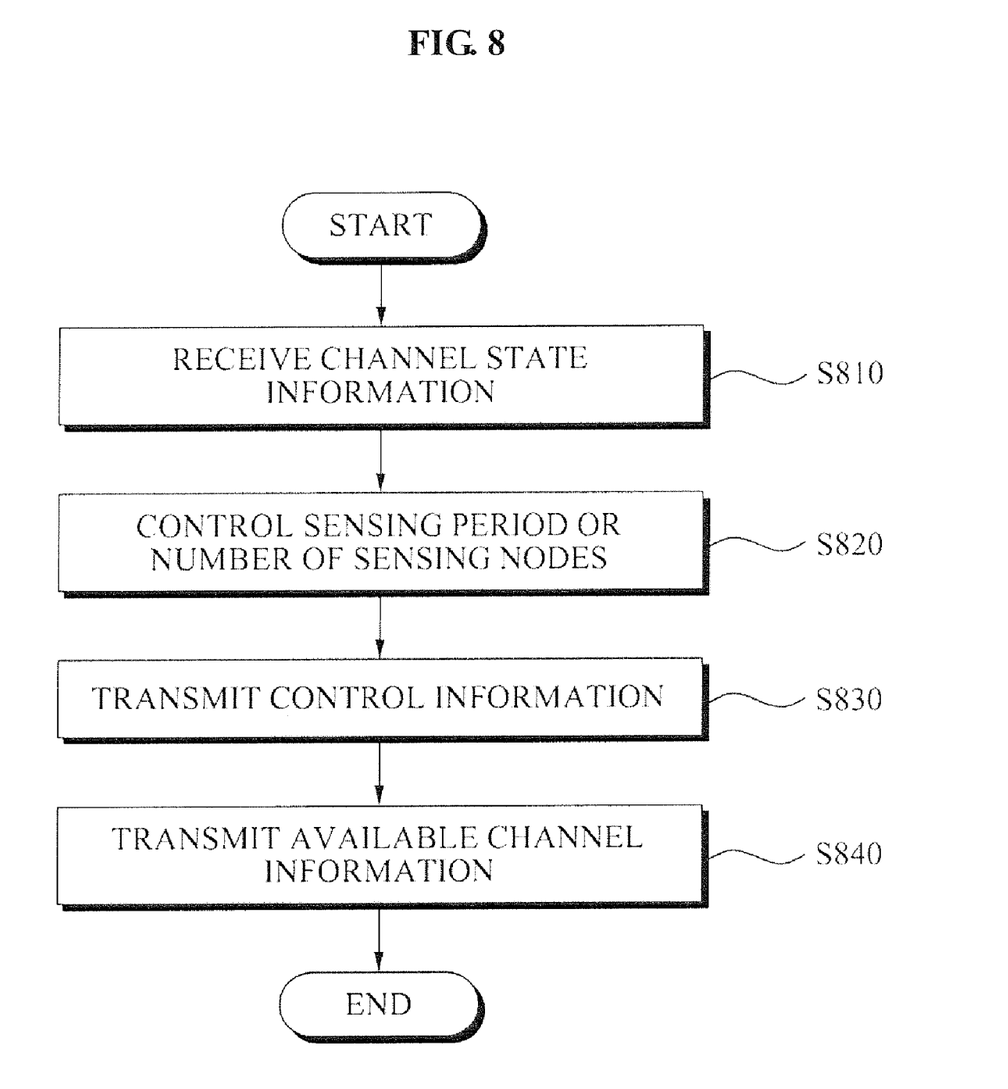
FIG. 8 is a flowchart of an operation method of a cognitive radio base station according to an embodiment of the invention.

FIG. 8 is a flowchart of an operation method of a cognitive radio base station according to an embodiment of the invention. In operation S810, the cognitive radio base station receives channel state information associated with a channel occupancy state of a primary system from at least one sensing node belonging to a secondary system.

In operation S820, the cognitive radio base station controls a sensing period of the at least one sensing node according to a change pattern of the channel occupancy state, based on the channel state information. In operation S830, the cognitive radio base station transmits control information associated with the controlled sensing period to at least one member node of the secondary system. In operation S840, the cognitive radio base station recognizes an available channel based on the channel state information and transmit information associated with the available channel to the at least one member node. Description not made with reference to FIG. 8 may adopt the description made with reference to FIGS. 1 through 7 and thus will be omitted here.

According to an aspect of the invention, the operation method of the cognitive radio terminal device includes recognizing a channel occupancy state of a primary system to transmit the channel state information to a cognitive radio base station; receiving control information associated with a sensing period from the cognitive radio base station; and sensing the channel occupancy state of the primary system according to the sensing period, based on the control information.

The cognitive radio base station and cognitive radio terminal device operating method according to aspects of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CDs and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cognitive radio communication apparatus to control sensing of frequency resources, comprising:
   an information receiver to receive channel state information associated with a channel occupancy state of a primary system from at least one sensing node of a secondary system;
   a sensing control unit to control a sensing period of the at least one sensing node according to a change pattern of the channel occupancy state, based on the channel state information; and
   a control information transmitter to transmit control information associated with the controlled sensing period to at least one member node of the secondary system.

2. The apparatus as claimed in claim 1, wherein:
   the sensing control unit determines a number of the at least one sensing node according to the change pattern of the channel occupancy state, and
   the control information transmitter transmits information associated with the determined number of the at least one sensing node to the at least one member node.

3. The apparatus as claimed in claim 2, wherein the sensing control unit increases the number of the at least one sensing node as a change of the channel occupancy state increases, or decreases the number of the at least one sensing node as the change of the channel occupancy state decreases.

4. The apparatus as claimed in claim 1, wherein the sensing control unit decreases the sensing period as a change of the channel occupancy state increases.

5. The apparatus as claimed in claim 1, wherein the sensing control unit increases the sensing period as a change of the channel occupancy state decreases.

6. The apparatus as claimed in claim 1, wherein the at least one sensing node is selected from a cluster that includes the at least one member node.

7. The apparatus as claimed in claim 1, further comprising:
   an available channel information transmitter to recognize an available channel based on the channel state information and to transmit information associated with the available channel to the at least one member node.

8. A cognitive radio terminal device comprising:
   an information transmitter to recognize a channel occupancy state of a primary system and to transmit channel state information to a cognitive radio base station;
   a control information receiver to receive control information associated with a sensing period from the cognitive radio base station; and
   a sensing unit to sense the channel occupancy state of the primary system according to the sensing period, based on the control information,
   wherein the cognitive radio base station controls the sensing period according to a change pattern of the channel occupancy state based on the channel state information, and the control information is associated with the controlled sensing period.

9. The terminal device as claimed in claim 8, wherein the cognitive radio base station decreases the sensing period as a change of the channel occupancy state increases, or increases the sensing period as the change of the channel occupancy state decreases.

10. The terminal device as claimed in claim 9, wherein the cognitive radio base station increases a number of sensing nodes as the change of the channel occupancy state increases, or decreases the number of sensing nodes as the change of the channel occupancy state decreases.

11. The terminal device as claimed in claim 8, wherein the cognitive radio base station determines a number of sensing nodes to sense the channel occupancy state of the primary system according to the change pattern of the channel occupancy state, and transmits information associated with the controlled number of sensing nodes to at least one member node of a secondary system.

12. A communication apparatus to transmit/receive a signal generated according to a data frame, comprising:
    a sensing subframe that is a time slot where at least one sensing node of a secondary system senses a channel occupancy state of a primary system;
    a notification subframe that is a time slot where the at least one sensing node transmits channel state information associated with the channel occupancy state to a cognitive radio base station;
    a control information subframe that is a time slot where the cognitive radio base station transmits control information to at least one member node of the secondary system, wherein the cognitive radio base station controls a sensing period of the at least one sensing node according to a change pattern of the channel occupancy state, based on the channel state information, and the control information is associated with the controlled sensing period; and
    a data subframe that is a time slot where the cognitive radio base station and the at least one member node perform data communication.

13. The communication apparatus as claimed in claim 12, wherein, in the control information subframe, the cognitive radio base station recognizes an available channel based on the channel state information and transmits information associated with the available channel to the at least one member node.

14. The communication apparatus as claimed in claim 12, wherein:
    the cognitive radio base station determines a number of the at least one sensing node according to the change pattern of the channel occupancy state, and
    in the control information subframe, the cognitive radio base station transmits information associated with the determined number of the at least one sensing node to the at least one member node.

15. The communication apparatus as claimed in claim 14, wherein the cognitive radio base station increases a number of the at least one sensing node as a change of the channel occupancy state increases, or decreases the number of the at least one sensing node as the change of the occupancy state decreases.

16. The communication apparatus as claimed in claim 12, wherein the at least one sensing node is selected from a cluster that includes the at least one member.

17. The communication apparatus as claimed in claim 12, wherein the cognitive radio base station decreases the sensing period as a change of the channel occupancy state increases, or increases the sensing period as the change of the channel occupancy state decreases.

18. A method of operating a cognitive radio base station, comprising:
    receiving channel state information associated with a channel occupancy state of a primary system from at least one sensing node of a secondary system;
    controlling a sensing period of the at least one sensing node according to a change pattern of the channel occupancy state, based on the channel state information; and
    transmitting control information associated with the controlled sensing period to at least one member node of the secondary system.

19. The method as claimed in claim 18, wherein:
    the controlling of the sensing period comprises determining a number of the at least one sensing node according to the change pattern of the channel occupancy state, and
    the transmitting of the control information comprises transmitting information associated with the determined number of the at least one sensing node to the at least one member node.

20. The method as claimed in claim 19, wherein the controlling of the sensing period comprises increasing a number of the at least one sensing node as a change of the channel occupancy state increases, or decreasing the number of the at least one sensing node as the change of the channel occupancy state decreases.

21. The method as claimed in claim 18, wherein the controlling of the sensing period comprises decreasing the sensing period as a change of the channel occupancy state increases, or increasing the sensing period as the change of the channel occupancy state decreases.

22. A computer-readable recording medium storing a program that, when executed, causes a cognitive radio base station to execute the method of claim 18.

23. A method of operating a cognitive radio terminal device, comprising:
    recognizing a channel occupancy state of a primary system to transmit channel state information to a cognitive radio base station;
    receiving control information associated with a sensing period from the cognitive radio base station; and
    sensing the channel occupancy state of the primary system according to the sensing period, based on the control information;
    wherein the cognitive radio base station controls the sensing period according to a change pattern of the channel occupancy state based on the channel state information and the control information is associated with the controlled sensing period.

24. The method as claimed in claim 23, wherein the cognitive radio base station decreases the sensing period as a change of the channel occupancy state increases, or increases the sensing period as the change of the channel occupancy state decreases.

25. The method as claimed in claim 23, wherein the cognitive radio base station determines a number of sensing nodes to sense the channel occupancy state of the primary system according to the change pattern of the channel occupancy state, and transmits information associated with the determined number of sensing nodes to at least one member node of a secondary system.

* * * * *